United States Patent [19]
Sirven

[11] Patent Number: 6,018,310
[45] Date of Patent: Jan. 25, 2000

[54] RADAR DEVICE WITH FALSE-ALARM CONTROL ON SCATTER

[75] Inventor: Jacques Sirven, Saint-Cloud, France

[73] Assignee: Electronique Serge Dassault, Saint-Cloud, France

[21] Appl. No.: 07/377,289

[22] Filed: Jun. 23, 1989

[30] Foreign Application Priority Data

Jul. 8, 1988 [FR] France .................................. 88 09349

[51] Int. Cl.[7] .................................................. G01S 13/00
[52] U.S. Cl. ............................................. 342/159; 342/93
[58] Field of Search ................................ 342/90, 91, 93, 342/159, 378, 379

[56] References Cited

U.S. PATENT DOCUMENTS 3,918,055  11/1975  Shimizu et al. .
4,143,372   3/1979  Salvaudon et al. .
4,323,899   4/1982  Barnes et al. .
4,381,508   4/1983  Durboraw, III .
4,670,753   6/1987  Vacanti .

*Primary Examiner*—Mark Hellner
*Attorney, Agent, or Firm*—Nixon & Vanderhye P.C.

[57] ABSTRACT

The invention relates to a radar device comprising two antennae fed by the same emission means, but serving reception means which are separated at least in part into two channels, followed by exploitation means. It is applied, in particular, when the antennae have substantially the same main lobe, but side lobes or scatters which are at least in part different. The exploitation means are capable of considering as a false alarm any echo received with a level below a selected threshold in one of the reception channels.

12 Claims, 4 Drawing Sheets

RADAR DEVICE WITH FALSE-ALARM CONTROL ON SCATTER

BACKGROUND OF THE INVENTION

1. Field of the Invention

The invention relates to radars.

2. Discussion of Prior Art

Intrinsically, the reception part of a radar provides a representation of the electromagnetic energy received, within a frequency band determined by its emission characteristics, having regard to the application concerned. Reference is frequently made to radar "echoes", but, in order to define such echoes, it is already necessary to carry out a processing utilizing the energy received.

Conventionally, such a processing includes the analysis of the energy received in the time-frequency domain. In principle, the time analysis involves range "ports"(or "windows"), while the frequency analysis involves Doppler ports (or windows), whilst certain radars have a more subtle operation (for example, the case of a linear frequency modulation on emission). The combination of the breakdown into range ports on the one hand and Doppler ports on the other hand provides range-Doppler diagrams.

Stricto sensu, there is a "radar echo" only if the energy received in a given plot exceeds a certain threshold. The definition of such thresholds is important, since it determines the "false-alarm probability" of the radar.

The designation "false-alarm control" is used to refer to the means permitting the definition of the said thresholds, or alternatively criteria which are more sophisticated than a simple threshold and permit the discrimination of echoes in the energy received. If this control is badly performed, the system for the exploitation of the radar echoes will have, in principle, too many plots detected to be analyzed, and will be saturated (it might also have too few of these, which would signify that objects to be detected will be missed, which is an absolutely unacceptable situation).

In order to discriminate the genuine echoes, it is necessary to eliminate a priori the thermal noise. In numerous radars, the fixed objects ("ground echoes") are also to be eliminated. A difficulty arises in these circumstances, since, if the thermal noise is of a very low level, conversely the ground echoes are of a high level, or even a very high level, that is to say greater than the level of the useful echoes.

This difficulty is partially alleviated by the fact that, in general, means are available for specifically filtering the ground echoes. Thus, the problem exists only in the case of those of the ground echoes which have escaped the filtering. The origin of these "parasitic residues" differs, depending upon whether the radar is fixed or carried by a movable platform, such as an aircraft.

In the case of a fixed radar, the ground echoes of close origin may exhibit very large radar equivalent surfaces. This is so, for example, in the case of hangars or other constructions close to a radar for monitoring air traffic, and reflecting the noise energy of the emitter. The false-alarm control may be undertaken:

either by placing a limiter at the input of the Doppler filter, to desensitize the receiver in the presence of a strong echo, or by slaving the detection threshold as a function of the level of the echo measured before Doppler filtering; this second technique does not modify the spectrum of the signals passing through the Doppler filter, and can therefore be used even if the spectrum of the ground echoes is relatively extended in frequency.

In the case of a movable radar, the problem of false-alarm control is radically different, since the origin of these false alarms is entirely different.

First of all, the ground echoes at very high level are rare, since in principle the main lobe of the antenna does not illuminate the ground at short range. It remains the case that the side lobes of the antenna (if they are large) may receive ground echoes of relatively high level, with a Doppler frequency which corresponds to that of useful echoes. The usual means for controlling the false alarms consists in utilizing two channels, that is to say two receivers associated with two antennae; the first channel operates normally, while the second, of omnidirectional type, or more precisely of less directional type, is controlled in such a manner as to cover the side lobes of the first channel. The false-alarm control is then undertaken by comparing the outputs of the two channels for each range/Doppler resolution cell or plot. A useful signal corresponds to the case where the output level of the first channel exceeds that of the second, for the same plot.

This means does not give complete satisfaction in all cases. In particular, there are applications in which it is impossible to provide a second channel having the characteristics of "less directionality" which are desired. It is, in fact, necessary that the radiation pattern of this second channel should be situated significantly below that of the first channel, in the main lobe of the latter, and slightly above that of the first channel, in its side lobes; failing this, the false-alarm control might involve losses of detection with respect to a useful target, since the detection threshold would become abnormally high as soon as ground echoes, even of low level, appeared in the auxiliary channel, which ground echoes would not correspond to the side lobes of the first channel.

This problem arises, in particular, when the main lobe does not have a very high gain (aerial at large angle), and when the level of the side lobes is not well known or is difficult to determine with a sufficient precision.

SUMMARY OF THE INVENTION

The present invention manages to provide means capable of replacing or supplementing the arrangements described hereinabove.

A further object of the invention is to solve the problems encountered when aerials are set up in the vicinity of a structural element whose electromagnetic characteristics are not well known or are variable (for example, a movable structural element). It does, in fact, emerge from this that the side lobes of the aerials are likewise not well known.

An even more specific object of the invention is to permit the arrangement of aerials pointing towards the rear of an aircraft, without being excessively disturbed by the ground echoes.

Accordingly the present invention provides a radar device, comprising two antennae fed by the same emission means, but serving reception means which are separated at least in part into two channels, followed by exploitation means, wherein said antennae have substantially the same main illumination zone but have side lobes for the diffuse radiations which are at least in part different, and wherein the exploitation means are capable of considering as a false alarm any echo received with a level below a threshold selected in one of the reception channels. In order to simplify the statement, it will be assumed that the diffuse radiations of the two aerials are totally severed. Subject to an appropriate selection of the threshold, it is then possible to distinguish the echoes received by the diffuse radiation of only one of the aerials, which will give rise to an echo below the threshold in the other aerial, and the echoes received through the main lobes of both aerials, which will both be above the threshold.

An essential aspect of the invention resides in that this exhibits quite remarkable advantages when the emission means which are used are of the high-frequency recurrence type and, in principle, operate with a high form factor.

In order to implement the invention with such radars, it is entirely beneficial that the reception channels should carry out, first of all, a Doppler analysis, and then a range analysis, if the application requires this.

In this latter case, the reception channels may carry out the range analysis by split filtering, on the one hand on a selected intermediate frequency, and on the other hand on this intermediate frequency increased by a multiple of the recurrence frequency, while the filtering pass band is, on each occasion, at most equal to the value of the recurrence frequency.

In an embodiment of the invention, the exploitation means compare the corresponding echoes (the same Doppler/range plot) emanating from the two channels with the selected threshold, and eliminate the pairs of echoes for which at least one of the two channels is below the threshold.

In another embodiment of the invention, the exploitation means construct the product of an echo of one channel and the conjugate of the echo of the other channel, and eliminate the pairs of echoes for which this product (which represents the product of the energies received on the two channels) is below the selected threshold.

Although the invention is capable of various applications, it is quite especially suitable for the case where use is made of two antennae (at least) which are set up on both sides of the vertical stabilizer of an aircraft (or, more generally, of a structural element of a movable carrier) and directed towards the rear. The arrangement is such that the reception means are sensitive only to the energy returns, the Doppler analysis of which demonstrates a closing in relation to the aircraft. According to the invention, the exploitation means may thus eliminate the false alarms due especially to ground points situated towards the front of the aircraft.

The antennae which can be used for this type of application frequently have a fairly large angular aperture (typically 90°), and thus a fairly small gain differential between the main lobe and the side radiation, which is, moreover, fairly poorly defined, on account of the structural elements of the aircraft. The difficulty which is then encountered is that the ground echoes originating from the front of the aircraft and entering through the scatter of the aircraft, which, for the majority of the time, are at a high level on account of their radar equivalent surface which is likewise large, are very troublesome for the Doppler analysis and detection, which are intended to reference moving objects approaching from the rear. The present invention provides an entirely elegant solution to this problem.

For this type of application, it will likewise be beneficial to provide at least three antennae, for example two antennae on each side of the vertical stabilizer (or alternatively one on one side and two on the other), in such a manner as to be able to undertake a distance measurement. Reception means are available, which are at least partially separated for these various antennae; this provides, in total, at least three reception channels. Furthermore, the exploitation means will operate, on each occasion, between the reception channels relating to two antennae situated on either side of the vertical stabilizer.

This permits the performance of a measurement of relative bearing between two antennae situated at the same horizontal level (the horizontal being, in this case, the plane of the wings of the aircraft) and of a measurement including the elevation between two antennae situated at different horizontal levels.

BRIEF DESCRIPTION OF THE DRAWINGS

Further features and advantages of the invention will become evident on examining the detailed description given hereinbelow, and the accompanying drawings, in which.

DETAILED DESCRIPTION OF PREFERRED EMBODIMENTS

Figure 1:
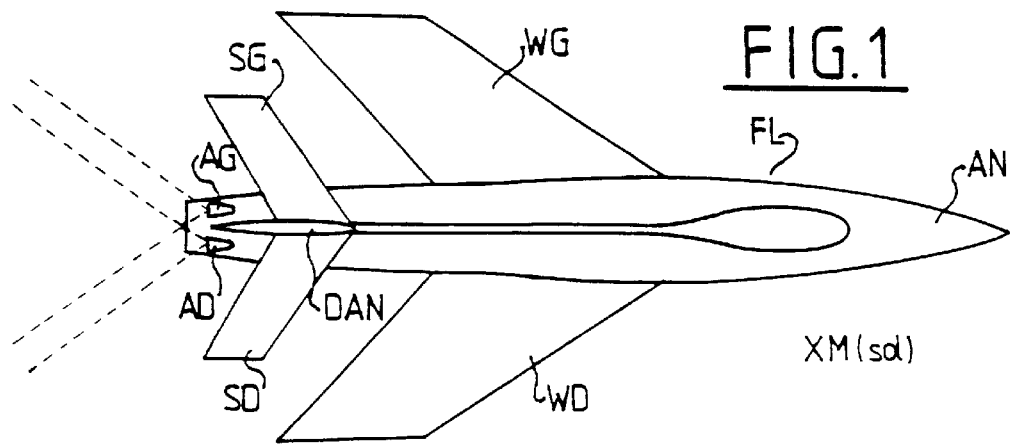
FIG. 1 diagrammatically illustrates an aircraft equipped with two antennae, and capable of accommodating a radar device according to the present invention.

In FIG. 1, an aircraft AN possesses a fuselage FL, port and starboard wings, WG and WD, and at the rear a vertical stabilizer DAN emerging axially, with, on both sides, horizontal stabilizers SG and SD.

At least one port antenna AG and one starboard antenna AD are mounted on the fuselage and on either side of the vertical stabilizer. The two antennae have, for example, a radiation pattern having an angular aperture of 90° facing the rear and having an axis parallel to the longitudinal axis of the aircraft.

Figure 2:
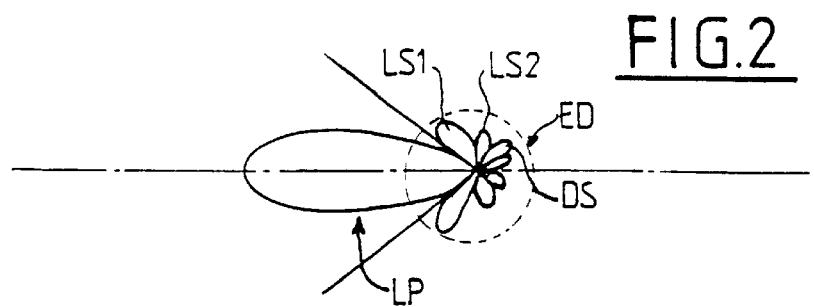
FIG. 2 diagrammatically illustrates the radiation pattern of an aerial.

FIG. 2 shows diagrammatically the radiation pattern of an antenna, which includes a main lobe LP facing the rear, and major side lobes LS1 and LS2 which are accompanied by a scatter DS, which is less well defined and which is also designated "far side lobes".

As already indicated, it is known to resolve certain difficulties by providing two aerials, one of which possesses the radiation pattern illustrated in solid lines in FIG. 2, while the other possesses the radiation pattern illustrated in broken lines, and denoted ED (envelope of the scatter and of the side lobes). This solution is not entirely satisfactory, especially in the cases where the gain of the main lobe as compared with the side lobes is not very great, and likewise when the knowledge of the scatter is poor. This is specifically the case with regard to the setting-up of antennae on board an aircraft, in the manner illustrated in FIG. 1, for example.

Figure 3:
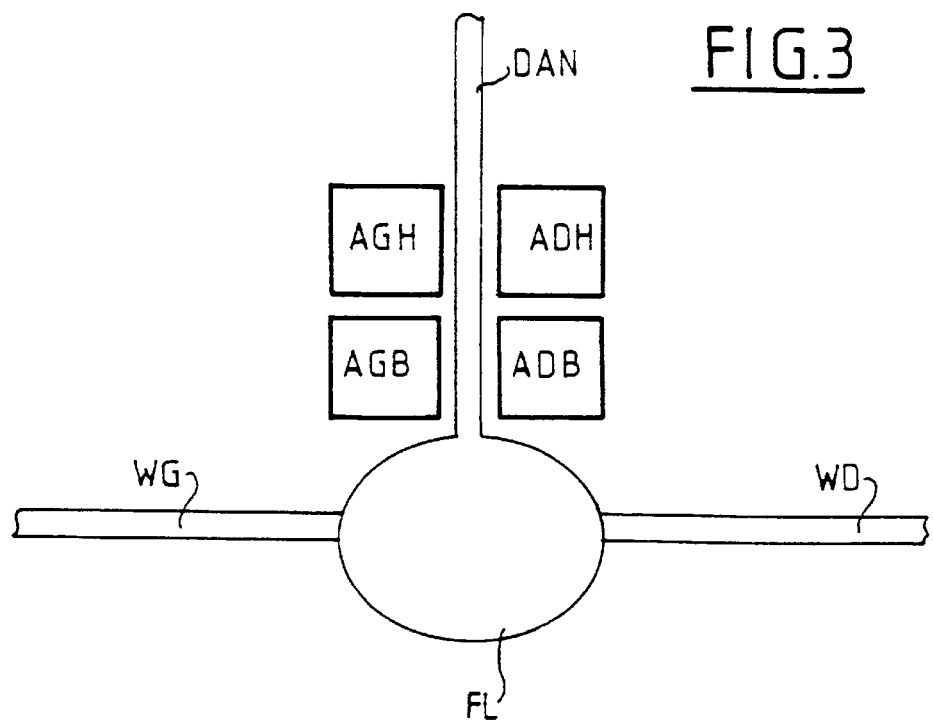
FIG. 3 illustrates very diagrammatically a preferred embodiment of the invention with four aerials.

FIG. 3 diagrammatically illustrates an aircraft, in a rear view, and shows the setting-up of four antennae on either side of its vertical stabilizer DAN. The following are distinctly presented: a high port antenna AGH, a low antenna AGB, and, on the other side, a starboard antenna ADH and a starboard antenna ADB. A person skilled in the art will appreciate that three antennae are sufficient. The fourth antenna may be useful for reasons of symmetry (radioelectric and/or aerodynamic), with or without an associated reception channel. In the following part of the present description, the symbol AG designates one of the port antennae, and the symbol AD designates one of the starboard antennae.

Figure 4:
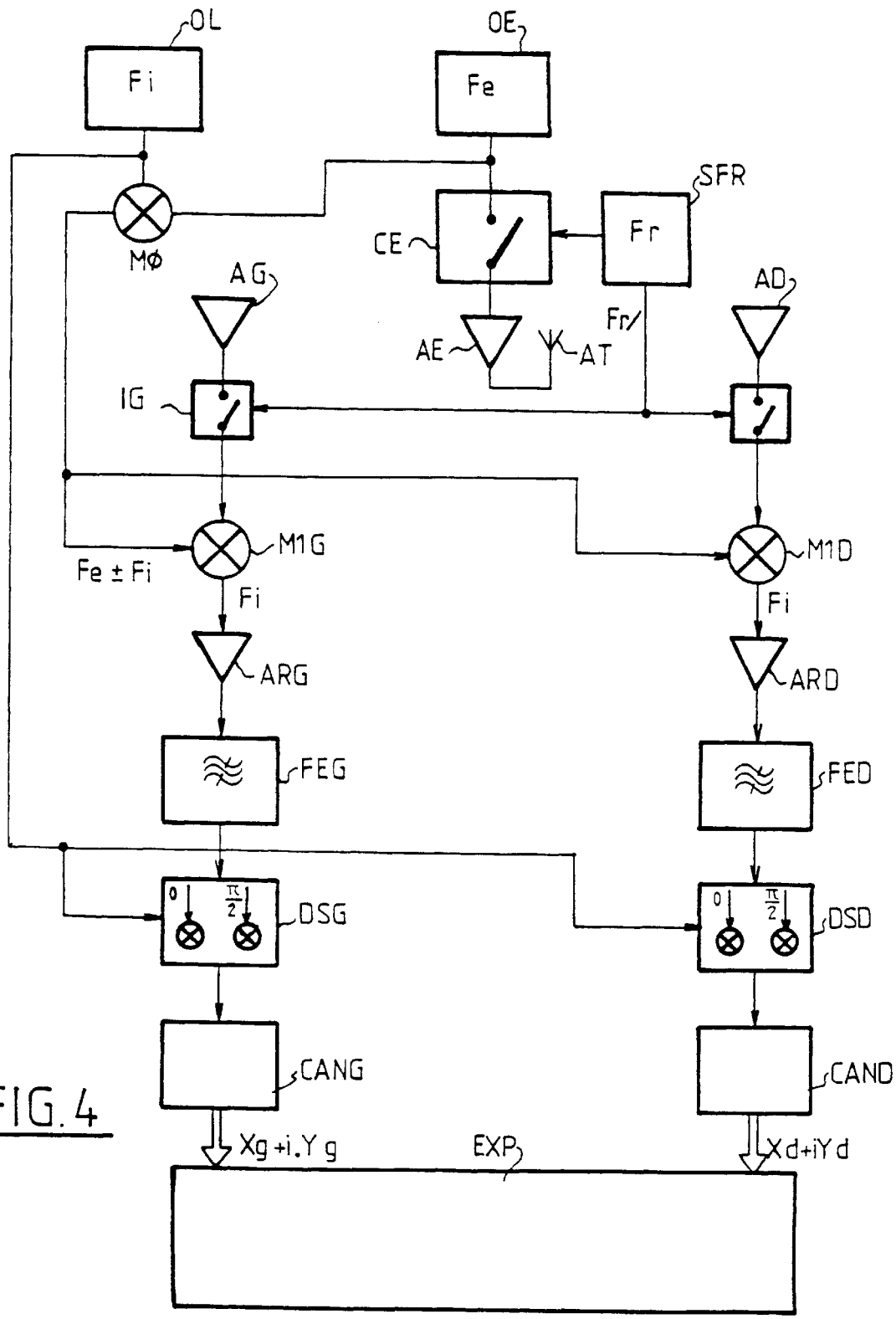
FIG. 4 is the block diagram of a radar device according to the present invention.

Thus, these two antennae AG and AD are found again in FIG. 4.

The emission means of the radar device include an emission oscillator 01 operating at a frequency Fe, followed by an emission switch CE actuated at a recurrence rate Fr, defined by a source SFR.

It is assumed, in this case, that the radar is of a high recurrence rate, typically a few tens of kilohertz at least, and that it possesses a high form factor, that is to say that the emission switch CE is closed during a large part of the duration of the recurrence period (for example, one half of this period). The modulated signal thus obtained is applied to an emission amplifier AE which feeds an emission antenna AT. In a variant, it could feed the antennae AG and AD, via circulators (see the variant of FIG. 5).

A local oscillator OL supplies an intermediate frequency Fi. A mixer Mφ receives the frequencies Fi and Fe to supply a signal of the form Fe±Fi, which is applied to two reception mixers MlG and MlD. The latter receive, moreover, respectively the outputs of the antennae AG and AD, possibly after passing via the switches IG and ID, which are open during the emission. This thus defines the starting point of two entirely separate reception channels. (However, a person skilled in the art is aware that the techniques of multiplexing which are currently available, especially after encoding in digital form, permit the use, in frequent cases, of common parts for the reception).

The outputs of the two mixers MlG and MlD, which are at the frequency Fi, are amplified in amplifiers ARG and ARD, and then filtered in narrow-band filters FEG and FED, before undergoing a synchronous demodulation in circuits DSG and DSD, which receive the frequency Fi from the source OL, and make use of one component in phase and one component in quadrature from the latter.

The output of the two demodulators DSG and DSD is applied to analog-digital converters CANG and CAND. The outputs of the latter may be respectively defined as:

Xg+i.Yg for the port channel,

Xd+i.Yd for the starboard channel.

In each case, the component X is that which is in phase with the intermediate frequency, while the component Y is that which is in quadrature, in accordance with the complex notation which is well known for the synchronous demodulation.

The two signals thus obtained are applied to the exploitation circuit EXP.

In terms of the concept of a high-frequency radar having a recurrence and a form factor which is high, it is considered that such a radar operates on a single range port. In practice, the Doppler analysis will involve the participation of a plurality of filters, within the pass band defined by the stages FEG and FED. The outputs of the two converters will thus be multiple, and will have allocated thereto a channel number k.

For each Doppler plot (possibly taking into account the range), the exploitation means will compare the outputs of the two converters, which outputs are taken as the square of the modulus, with a threshold Sφ. It is known that the square of the modulus is the sum $X^2+Y^2$. The threshold Sφ may be determined in conjunction with the thermal noise, or with the mean value observed on a plurality of Doppler filters, for example. This permits the determination of the plots for which a significant contribution is received by one of the aerials and on the other hand a very small contribution by the other. What is involved, in this case, is a ground point situated towards the front of the aircraft, such as the point M in FIG. 1. In fact, this point M may give a significant contribution via a side lobe or the scatter of the antenna AG.

On the other hand, for the antenna AD, it is completely masked by the vertical stabilizer DAN of the aircraft.

It is thus possible to define a very simple criterion for the elimination of all the ground points situated to the front of the aircraft, and which consequently have associated therewith a closing velocity in relation to the aircraft.

On the other hand, the ground points situated towards the rear will again enter in the same manner into the main lobes of the two antennae. However, this fact is not troublesome, to the extent that the radar is not interested in the ground echoes of the main lobe, but in objects which move in relation to such echoes. An appropriate Doppler filtering carries out the discrimination.

In a particularly beneficial application, the radar surveys only objects closing upon the aircraft from the rear. In these circumstances, the only troublesome factors are the ground echoes originating from the front, via the side lobes and/or the scatter. It is then sufficient to apply the invention, with a Doppler filtering which maintains only the closing velocities ("range of the positive Dopplers").

It is immediately appreciated that the invention permits the complete elimination of the effects of ground echoes which are troublesome, when it is sought to observe a moving object closing from the rear, or in other applications.

As already indicated, the discrimination in relation to the threshold may be undertaken in various ways.

The first consists in computing, on the one hand, $Xg^2+Yg^2$ and $Xd^2+Yd^2$, and in retaining as useful echoes only those for which the two quantities thus computed exceed the threshold.

Another manner of proceeding consists in computing a complex quantity A which is the product defined by the relation (I) just preceding the claims hereafter. When the modulus of this product A is less than a threshold, (which is not, of course, the same as the preceding one, under conditions which are in other respects the same) the exploitation circuit will assume that a false alarm is involved, that is to say of a ground point passing by the front of the aircraft. This threshold Sl may be determined as for the threshold Sφ. It may also be determined in a different manner.

For example, Sl may be equal to K times the quantity MR, which is defined by the relation (II) herein, with 0<K<1. A determination is made of the squares of the moduli of the two signals received, and MR is the greater of these squares.

In a variant, consideration is given to the real part (ax) and the imaginary part (ay) of the quantity A, which are defined by the relations (III) and (IV). These two quantities are the subject of respective low-pass filterings having the same characteristics, which transform them into bx and by, respectively. It is then possible to compare the modulus of the quantity B=bx+i. by with a threshold S2, which is determinable as in the case of the threshold Sφ.

This threshold may also be obtained by a low-pass filtering (possibly different from the preceding ones) of the aforementioned quantity MR, having allocated thereto a coefficient K2, which is within the range between φ and 1.

It is, of course, possible to envisage other criteria of decision permitting the discrimination of a different contribution in the two antennae.

For example, it has been observed that the phase of the quantity A (or of its transform B after low-pass filtering) is related to the direction of arrival of the echoes concerned. It is therefore possible to limit the analysis as a function of conditions relevant to the phase of this quantity A. If it is desired, for example, to limit the zone observed to the central part of the main radiation lobe, the rejection will take place of the measurements for which the phase of A is too far removed from zero, for example situated outside the range ±90°, which substantially corresponds to the half-power lobe.

This is appropriate for any radiation received, the phase of which is significant (which is true in the major side lobe or lobes, but not in the scatter). The application of conditions to the phase of A or B thus properly completes the application of the threshold. The simplest consists in forming an "AND" logic of these two conditions, in order that one and the other indicate a useful signal, that is to say other than a parasitic residue of a ground echo.

Since the implementation of the invention assumes the existence of two aerials, followed by two similar reception channels, it is possible to make use thereof in order to carry out a distance measurement.

Thus, a distance measurement in relative bearing may be carried out by using the two aerials AGH and ADH, or alternatively AGB and ADB (or the two pairs). A distance measurement in elevation may be carried out by using the aerials AGH and AGB on the one hand, as well as ADH and ADB on the other hand, which gives the sum and the difference of the elevation and of the relative bearing. A single one of these two measurements is sufficient, since the relative bearing is already available (in the case of 3 antennae). The processing of the distance measurement signals which is thus obtained is to be considered as known to a person skilled in the art, after the elimination, according to the present invention, of the disturbing echoes due, for example, to ground points which are closing.

In a particularly beneficial variant, the radar device according to the invention also permits a measurement of the range of the object (of the closing object, in the embodiment described).

This variant makes use of French Patent Application in the name of the Applicant filed on 24th June 1988 under No. 88/08542 and entitled "Improvement to airborne surveillance radars".

For all useful purposes, the descriptive content of said French Patent Application is to be considered as incorporated in the present description.

Figure 5:
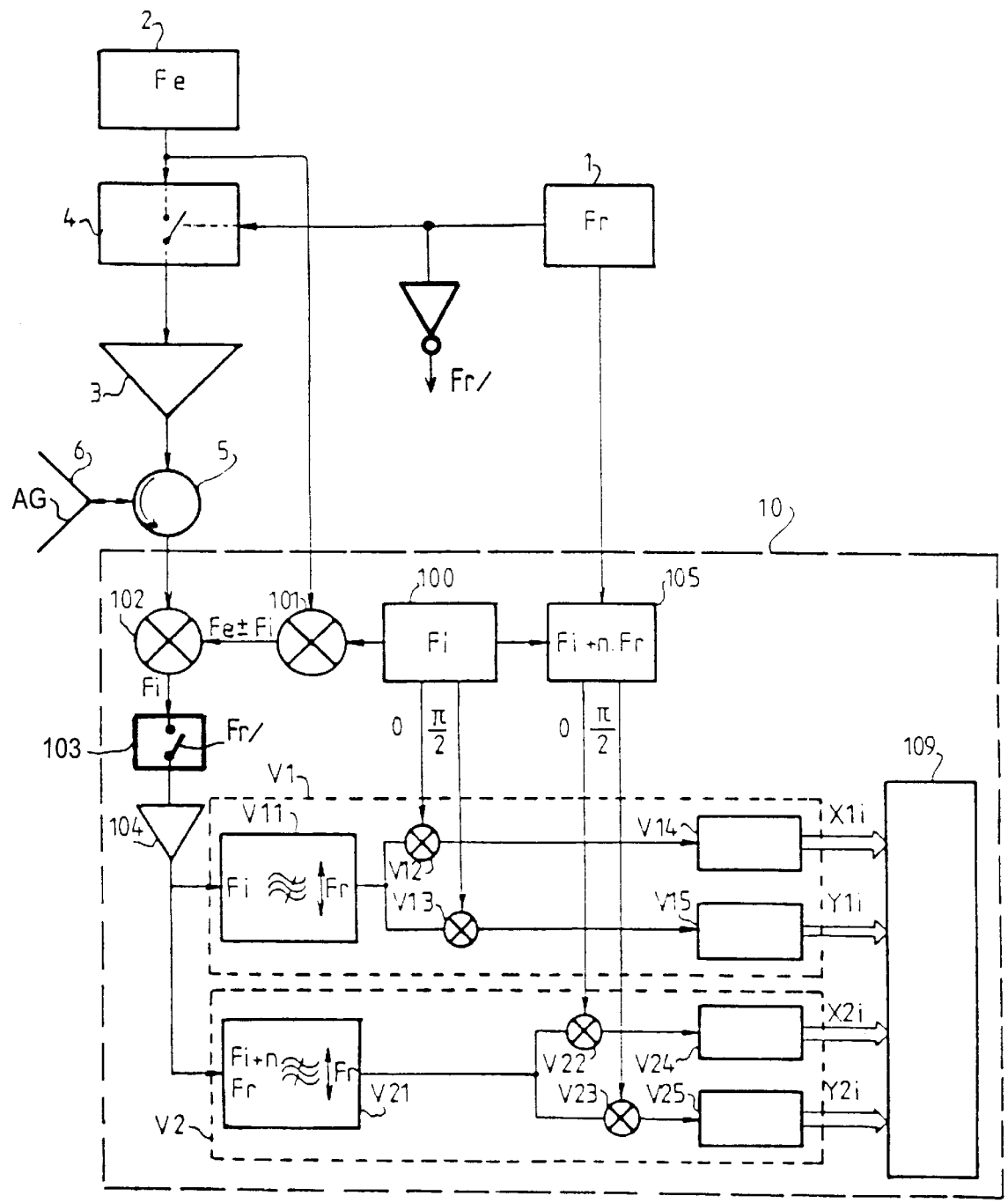
FIGS. 5 and 6 are two partial detailed diagrams applicable to a radar device according to the invention.

FIG. 5 illustrates the implementation of this range measurement, considering only one of the two antennae of FIG. 4, in order to simplify the drawing. In this figure, the alphanumeric references of said French Patent Application are maintained, and consideration is given to emission/reception common antennae.

The components 1, 2, 3, 4, 5, 6 and 100 correspond respectively to the components SFR, OE, AE, CE, CG and AG of FIG. 4 (where appropriate, for the port antenna).

The component 100 is the source of local oscillator OL. The component 101 corresponds to the mixer Mφ. The components 102 and 104 correspond to the mixer MIG and to the amplifier ARG, while the component 103 executes the interruption of reception during the emission.

FIG. 5 also shows a component 105 capable of producing a frequency equal to the sum of the intermediate frequency Fi and of the multiple of order n of the recurrence rate Fr, the whole with a component in phase and in quadrature. n may be chosen to be equal to 1.

After the amplifier 104, the reception is subdivided into two channels V1 and V2 which are identical except for the fact that their input filters V11 and V21 have the same pass band FR as according to the present invention, but different shifted frequencies, namely Fi for the filter V11 and Fi+NFR for the filter V21. It is thus possible to undertake the monitoring of these two synchronous detection filters operating respectively on the outputs of the sources 100 and 105, then with encoding and spectral analysis in the circuits V14, V15, V24, V25. The whole unit supplies real and imaginary components X1I and Y1I for the first channel, X2I and Y2I for the second channel, all of them being applied to an exploitation circuit 109.

A person skilled in the art will have appreciated that the first channel V1 operates precisely in the same manner as the assembly of the port channel illustrated in FIG. 4.

The invention can thus be implemented between the two channels V1 thus obtained, on the one hand for the port antenna AG, and on the other hand for the starboard antenna AD.

After selection according to the invention of the echoes not corresponding to false alarms, it is now possible to use separately the port and starboard channels, or, more precisely, their two sub-channels V1 and V2, in order to carry out a range measurement in the manner described in said French Patent Application already mentioned. Briefly, range information is obtained on account of the fact that the phase difference between the outputs of the two channels V1 and V2 (of each antenna) is linked to the range between the radar and an object causing received pulses.

Figure 6:
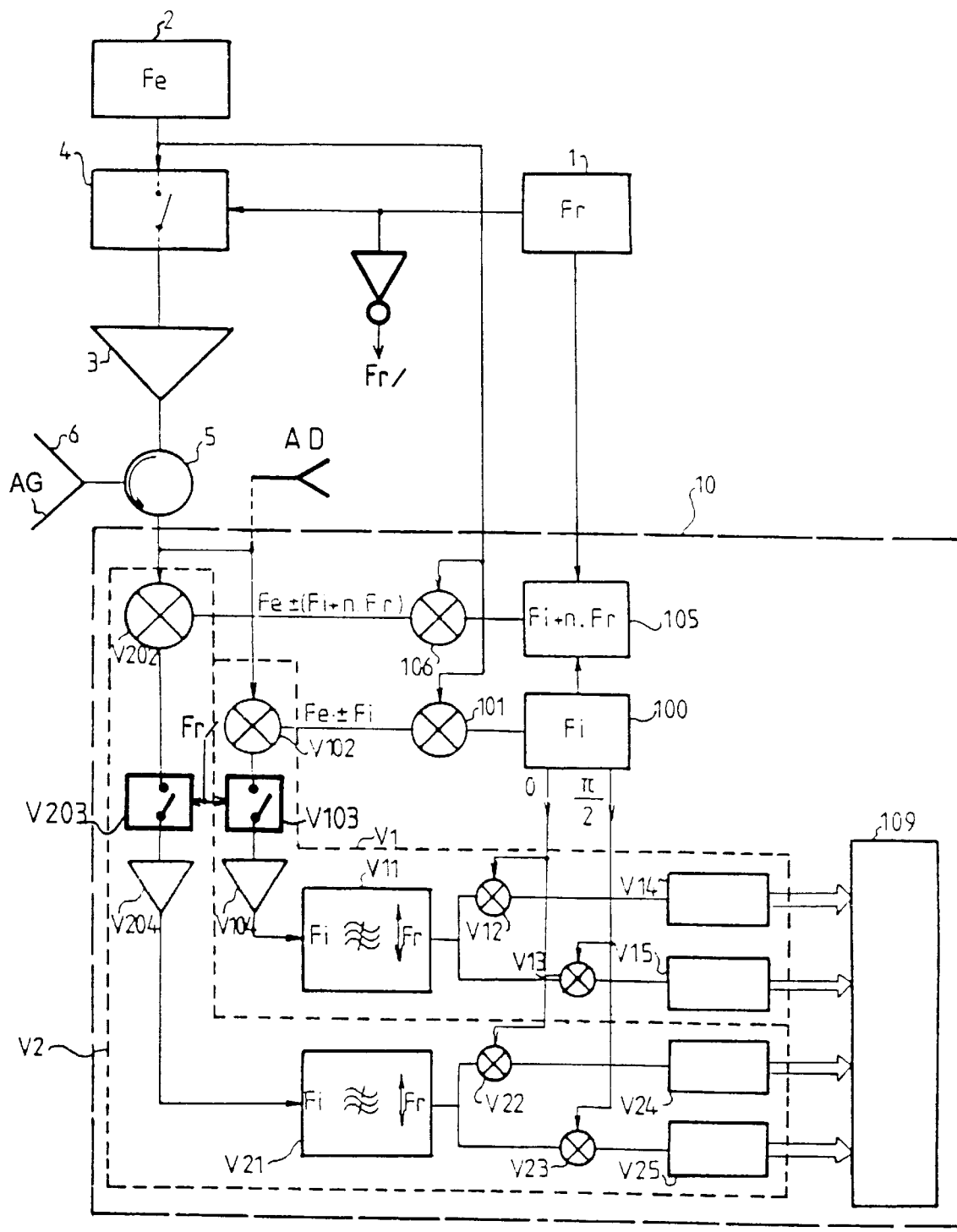

FIG. 6 illustrates an embodiment which is slightly different from that of FIG. 5. It will be observed that the channels V1 and V2 are more extended, on account of the fact that the filtering central frequency shift is obtained not at the filters V11 and V21 themselves, but, on the other hand, by the execution of the first change of frequency V102 (or V202) with two frequencies separated by n.FR.

This embodiment is advantageous in that the two reception channels V1 and V2, and especially their filters V11 and V21, may then be identical, which leads to a construction which is more convenient for a person skilled in the art, especially when it is necessary to take into account the intrinsic phase shifts of the circuits.

In this connection, it will be noted that the intrinsic phase shifts may be sampled once and for all, by applying, in each one of the reception channels, a small fraction of the emission signal, to obtain the response of each channel at zero range and Doppler.

A person skilled in the art will appreciate that the invention is not limited to the embodiments which have been described in detail.

For example, for the variants of FIGS. 5 and 6, it would be possible to use a channel V1 associated with the antenna AG and a channel V2 associated with the antenna AD. The phase shift between the channels V1 and V2 would then be dependent upon the range and upon the relative bearing. It is known how to obtain the range therefrom, since the relative bearing is known. This variant is illustrated diagrammatically in FIG. 6 in which, instead of receiving the output of the circulator 5, the channel V1 can receive the output of the antenna AD.

Moreover, a monopulse airborne radar utilizes, in general, sum and difference channels. It is known, based on these, to reconstruct (in video frequency) the equivalent of the signals received by distinct antenna segments (for example, starboard and port). These equivalents may directly feed the circuit EXP (FIG. 4). This is quite suitable for the elimination of the echoes, passing via the radome reflection lobes, which do not originate from the same direction in space for the two parts of the antenna. The threshold and angle double condition is particularly suitable for this case.

ANNEX—FORMULAE (I) $A = (Xg + i.Yg) \dot{x} (Xd + i.Yd)^*$ (II) $MR = MAX (Xg^2 + Yg^2, Xa^2 + Yd^2)$ (III) $A=(Xg.Xd+Yg.Yd)+i\,(Yg.Xd-Xg.Vd)$ (IX) $A=a_x+i.a_y$

I claim:

1. In a radar device, comprising first and second antennae; common emission means supplying said first and second antennae; reception means connected to said first and second antennae, said reception means being separated at least in part into first and second reception channels; and exploitation means connected downstream of said reception means; the improvement wherein:
    (a) said antennae have substantially the same main illumination zone, but first and second side lobes for the diffuse radiations which are at least in part different, and
    (b) the exploitation means further including means for indicating as a false alarm any echo received with a level below a threshold selected in one of the said first and second reception channels.

2. A radar device according to claim 1, wherein said emission means are of the high-recurrence-rate type.

3. A radar device according to claim 2, wherein said emission means are of the type operating with a high form factor.

4. A radar device according to claim 3, wherein said first and second reception channels includes means for carrying out a Doppler analysis, and a range analysis.

5. A radar device according to claim 4, wherein said means for carrying out the range analysis includes a means for split filtering, on the one hand, on a selected intermediate frequency, and on the other hand on this intermediate frequency increased by a multiple of the recurrence rate; and wherein a filtering pass band is, on each occasion, at most equal to the value of the recurrence rate.

6. A radar device according to claim 1, wherein said exploitation means includes means for comparing the corresponding echoes emanating from said first and second reception channels with said selected threshold, and for eliminating pairs of echoes for which at least one of said first and second reception channels is below said selected threshold.

7. A radar device according to claim 1, wherein said exploitation means includes means for constructing the energy product of the corresponding first and second echoes emanating from the first and second channels, and for eliminating those pairs of first and second echoes for which said product is below said selected threshold.

8. A radar device according to claim 1, wherein said first and second antennae are located on respective first and second sides of the vertical stabilizer of an aircraft and are directed towards the rear of the aircraft, and wherein said reception means includes means sensitive only to those energy returns whose Doppler analysis demonstrates a closing in relation to the aircraft, and said exploitation means includes means for eliminating false alarms due especially to ground points situated towards the front of the aircraft.

9. A radar device according to claim 8, and further including a third antenna on said second side of said vertical stabilizer, said reception means including a third reception channel, said third antenna being associated with third reception channel which is at least partially separated from said second reception channel, there being first, second and third reception channels; and wherein said exploitation means includes means responsive on each occasion between said first antenna and one of said second and third antennae.

10. A radar device according to claim 9, further including means for performing a measurement of relative bearing between said first and second antenna located at the same horizontal level relative to the aircraft, and for performing a measurement of elevation between said second and third antennae which are situated at different horizontal levels relative to the aircraft.

11. A radar device according to claim 9, further including a fourth antenna on said first side of said vertical stabilizer, and said reception means including a fourth reception channel at least partially separated from said first reception channel, there being a total of first, second, third and fourth reception channels; and wherein said exploitation means includes means responsive on each occasion between said fourth reception channel and one of said second and third reception channels.

12. A radar device according to claim 11, further including means for performing a measurement of relative bearing between said first and second antennae which are situated at the same horizontal level relative to the aircraft, and for performing a measurement of elevation between said second and third antennae which are situated at different horizontal levels relative to the aircraft, and for performing a measurement of relative bearing between said third and fourth antennae which are at the same horizontal level relative to the aircraft, and for performing at least one measurement of elevation between said first and fourth antennae which are at different horizontal levels relative to the aircraft.

* * * * *